(12) United States Patent
Ishii

(10) Patent No.: US 7,296,473 B2
(45) Date of Patent: Nov. 20, 2007

(54) PRESSURE SENSOR

(75) Inventor: Osamu Ishii, Tatuno-machi (JP)

(73) Assignee: Epson Toyocom Corporation, Kanagawa (JP)

( * ) Notice: Subject to any disclaimer, the term of this patent is extended or adjusted under 35 U.S.C. 154(b) by 0 days.

(21) Appl. No.: 11/503,178

(22) Filed: Aug. 14, 2006

(65) Prior Publication Data

US 2007/0056378 A1    Mar. 15, 2007

(30) Foreign Application Priority Data

Aug. 24, 2005    (JP) .............................. 2005-243486

(51) Int. Cl.
*G01L 7/06*    (2006.01)
(52) U.S. Cl. .................... 73/729.1; 73/715; 73/721; 73/753
(58) Field of Classification Search ........... 73/700–756
See application file for complete search history.

(56) References Cited

U.S. PATENT DOCUMENTS

| | | | |
|---|---|---|---|
| 4,406,966 A | | 9/1983 | Paros |
| 5,063,542 A | * | 11/1991 | Petermann et al. .......... 367/166 |
| 7,047,816 B2 | * | 5/2006 | Jones et al. ................. 73/729.1 |

FOREIGN PATENT DOCUMENTS

JP    A 56-119519    9/1981

JP    A 2004-205566    7/2004

* cited by examiner

*Primary Examiner*—Andre J. Allen
*Assistant Examiner*—Jermaine Jenkins
(74) *Attorney, Agent, or Firm*—Oliff & Berridge, PLC

(57) ABSTRACT

A pressure sensor includes: an airtight case equipped with first and second pressure input orifices provided respectively on opposing first and second wall surfaces; a cylindrical first bellows fixed on the first wall surface at one end and equipped with a shaft hole communicating with the first pressure input orifice; a cylindrical second bellows fixed on the second wall surface at one end; equipped with a shaft hole communicating with the second pressure input orifice and arranged in series with the first bellows; a resonator-adhering pedestal arranged and fixed between other ends of the first and second bellows; a lamellar piezoelectric resonator supported by the resonator-adhering pedestal, and an oscillation circuit electrically connected to an electrode pattern of the piezoelectric resonator. The piezoelectric resonator is fixed on the second wall surface at one end and fixed on the resonator-adhering pedestal at the other end; a piezoelectric reinforcement plate is fixed between the second wall surface and the resonator-adhering pedestal at a position across the second bellows from the piezoelectric resonator. An inner wall of the airtight case is joined to the resonator-adhering pedestal by a resilient reinforcement member.

9 Claims, 2 Drawing Sheets

PRESSURE SENSOR

BACKGROUND

1. Technical Field

The present invention relates to an improvement of a pressure sensor utilizing a piezoelectric resonatorresonator which includes an electrode pattern formed on a piezoelectric substrate such as a crystal substrate and, more particularly, to a pressure sensor utilizing a piezoelectric resonatorresonator whose resonant frequency varies when pressure is applied in an axis direction.

2. Related Art

Conventionally, a pressure sensor utilizing a crystal resonatorresonator is known as a detection element used in gauges such as a water pressure gauge, an air gauge, and a differential pressure gauge. The crystal resonatorresonator includes an electrode pattern formed on a plate-like crystal substrate. By taking advantage of the characteristics of the crystal resonatorresonator that its resonant frequency varies when pressure is applied in the axis direction, the pressure sensor is made to detect pressure changes.

With the pressure sensor using the crystal resonatorresonator, the resonant frequency varies in approximate proportion to the applied pressure (showing a quadratic curve). Thus, by compensating the relation between the frequency variation and the applied pressure by using a quadratic equation, high-precision pressure measurement becomes possible.

However, in an attempt to realize the high-precision pressure measurement, problems occur that the structure becomes complicated and the manufacturing cost becomes higher. For example, a conventional pressure sensor as disclosed in FIG. 4 of JP-A-56-119519 includes: a case equipped with a pressure input orifice on the wall surface and maintained in a vacuum or inert atmosphere on the inside, an electro-deposited bellows whose one end opening side is fixed on the wall surface of the case, a force transmitting member connected to the other end of the bellows, a resonator supporting member joined to the force transmitting member via a flexure hinge, and a plate-like crystal resonator whose both ends are each supported by the force transmitting member and the resonator supporting member. The resonator supporting member is fixed, at its base, on the inner wall of the case and is equipped with the flexure hinge (a pivot) at the part joined to the force transmitting member.

With this conventional example, it is necessary to use the electro-deposited bellows having a very small spring constant and the flexure hinge with slim constricted parts. Because of high cost of these parts, the cost of the whole product becomes inevitably high. FIG. 7 of JP-A-56-119519 depicts another system in which two electro-deposited bellows are arranged in series between opposing wall surfaces of the case. However, similarly to the first described conventional example, this system also requires the electro-deposited bellows having a very small spring constant and the flexure hinge with slim constricted parts, thereby further increasing the cost.

Further, for price reduction, a system using inexpensive molded bellows and the force transmitting member having no flexure hinge is proposed. However, the pressure sensor of this type has a disadvantage in that, as the applied pressure increases, a bending stress component is applied to the crystal resonator in addition to the axial force. Thus, a linear frequency variation (the quadratic equation) cannot be obtained, and a relation of a cubic curve having a third-order coefficient is produced. Thus, the method of compensating the relationship between the frequency variation and the applied pressure by the quadratic equation suffers a disadvantage that it decreases the precision.

To solve these problems, the inventor of the present invention conceived a pressure sensor in which two inexpensive molded cylindrical bellows are arranged in series or concentrically in an airtight case and in which a crystal resonator is supported by a pedestal arranged between the ends of both bellows.

However, it is learned that the pressure sensor of this type has a disadvantage of not having enough strength against impact in a direction (an X-axis direction) perpendicular to the axis direction of the cylindrical bellows.

SUMMARY

An advantage of the invention is to provide a pressure sensor that can solve the problem of not having enough strength against impact in the direction (the X-axis direction) perpendicular to the axis direction of the cylindrical bellows, which is the disadvantage of the pressure sensor having molded cylindrical bellows arranged in series or concentrically for the purpose of price reduction.

A first aspect of the invention is a pressure sensor having an airtight case equipped with first and second pressure input orifices provided respectively on opposing first and second wall surfaces, a cylindrical first bellows fixed on the first wall surface at one end and equipped with a shaft hole communicating with the first pressure input orifice, a cylindrical second bellows fixed on the second wall surface at one end, equipped with a shaft hole communicating with the second pressure input orifice, and arranged in series with the first bellows, a resonator-adhering pedestal arranged and fixed between other ends of the first and second bellows, a lamellar piezoelectric resonator supported by the resonator-adhering pedestal, and an oscillation circuit electrically connected to an electrode pattern of the piezoelectric resonator, in that: the piezoelectric resonator is fixed on the second wall surface at one end and fixed on the resonator-adhering pedestal at the other end; a piezoelectric reinforcement plate is fixed between the second wall surface and the resonator-adhering pedestal at a position across the second bellows from the piezoelectric resonator; and an inner wall of the airtight case is joined to the resonator-adhering pedestal by a resilient reinforcement member.

A second aspect of the invention is a pressure sensor having: an airtight case equipped with first and second pressure input orifices provided respectively on first and second opposing wall surfaces; a cylindrical first bellows fixed on the first wall surface at one end and equipped with a shaft hole communicating with the first pressure input orifice; a cylindrical second bellows fixed on the second wall surface at one end and equipped with a shaft hole communicating with the second pressure input orifice; a resonator-adhering pedestal arranged and fixed between other ends of the first and second bellows; a lamellar piezoelectric resonator supported by the resonator-adhering pedestal; and an oscillation circuit electrically connected to an electrode pattern of the piezoelectric resonator; in that: the first bellows is smaller in diameter than the second bellows, and the other end of the first bellows and the other end of the second bellows are fixed by the resonator-adhering pedestal in a manner that the other end of the first bellows is inserted in the shaft hole from the other end of the second bellows; the piezoelectric resonator is fixed on the second wall surface at one end and fixed on the resonator-adhering pedestal at the other end; a piezoelectric reinforcement plate is fixed between the second wall surface and the resonator-adhering pedestal at a position across the second bellows from the piezoelectric resonator; and an inner wall of the airtight case is joined to the resonator-adhering pedestal by a resilient reinforcement member.

A third aspect of the invention is a pressure sensor having: an airtight case equipped with first and second pressure input orifices provided respectively on opposing first and second wall surfaces and with a side wall joining the first wall surface to the second wall surface; a planar first bellows that forms a first airtight space communicating with the first pressure input orifice between a peripheral edge of the first bellows and the first wall surface or between the first wall surface and the side wall and that forms a second airtight space between the side wall and the second wall surface, by fixing the peripheral edge of the first bellows on a support part disposed on either the first wall surface or the side wall; a cylindrical second bellows arranged in the second airtight space, fixed on the second wall surface at one end, equipped with a shaft hole communicating with the second pressure input orifice, and arranged in series with the first bellows; a resonator-adhering pedestal arranged and fixed between a central part of the first bellows and an other end of the second bellows; a lamellar piezoelectric resonator supported by the resonator-adhering pedestal; and an oscillation circuit electrically connected to an electrode pattern on the piezoelectric resonator; in that: the piezoelectric resonator is fixed on the second wall surface at one end and fixed on the resonator-adhering pedestal at the other end; a piezoelectric reinforcement plate is fixed between the second wall surface and the resonator-adhering pedestal at a position across the second bellows from the piezoelectric resonator; and an inner wall of the airtight case is joined to the resonator-adhering pedestal by a resilient reinforcement member.

It is preferable that, with the pressure sensor of the first aspect of the invention, the resilient reinforcement member be a plate-like reinforcement spring and that a plurality of plate-like reinforcement springs be arranged on the periphery of the resonator-adhering pedestal at a predetermined circumferential pitch.

It is preferable that, with the pressure sensor of the first aspect of the invention, the resilient reinforcement members be arranged in a circumferential direction of the resonator-adhering pedestal corresponding to the arrangement position of the piezoelectric resonator and in a circumferential direction of the resonator-adhering pedestal opposite from the piezoelectric resonator.

According to the first and second aspects of the invention, an inexpensive and high-precision pressure sensor may be realized without using expensive electro-deposited bellows or complex support mechanism, by using the pressure sensor that has the two cylindrical bellows arranged in series or coaxially inside the case maintained in a vacuum or inert atmosphere and that employs a principle that the resonant frequency of the piezoelectric resonator is varied by transmitting an axial displacement force of each bellows produced by the pressure applied into the shaft hole of each bellows. Further, by disposing the resilient reinforcement members between the resonator-adhering pedestal and the inner wall of the airtight case, it may be possible to increase the strength against impact in the X-axis direction.

According to the third aspect of the invention, by making one of the bellows to be the planar bellows, it may be possible to shrink the pressure sensor in the axial direction and to also shrink the pressure sensor in the diameter direction since a small cylindrical bellows having the smallest possible diameter can be used as the other cylindrical bellows. Further, by disposing the resilient reinforcement member between the resonator-adhering pedestal and the inner wall of the airtight case, it may be possible to increase the strength against impact in the X-axis direction.

In the first aspect of the invention, because it is preferable that the plurality of plate-like reinforcement springs be arranged on the periphery of the resonator-adhering pedestal at a predetermined circumferential pitch, it may be possible to increase the strength against impact in the X-axis direction.

In the first aspect of the invention, because it is preferable that the arrangement positions of the resilient reinforcement members be chosen to be in the same circumferential direction position as that of the piezoelectric resonator and in the circumferential direction position opposite from the piezoelectric resonator, it may be possible to increase durability against the impact and vibration applied to the piezoelectric resonator in the X-axis direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
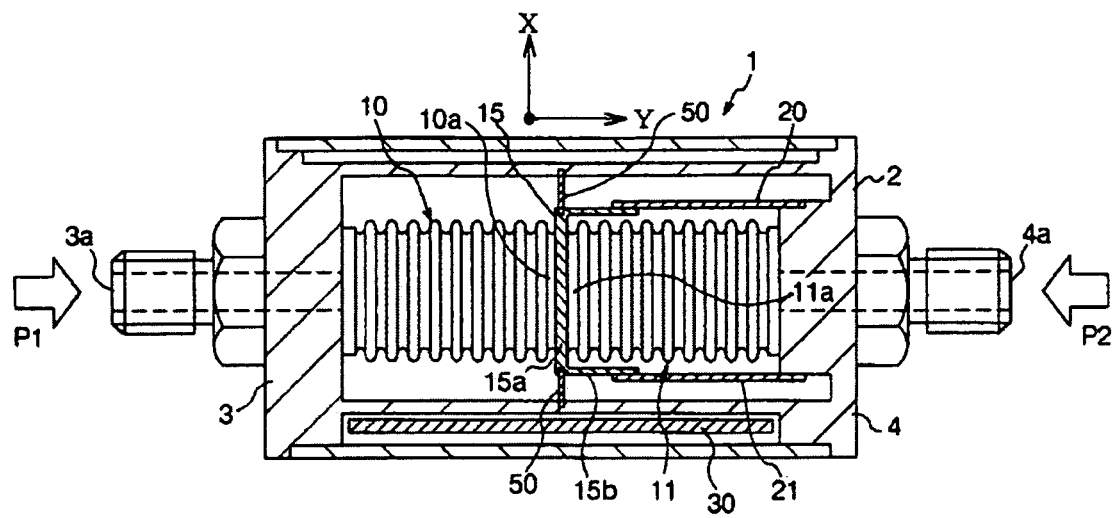
FIG. 1 is a cross-sectional diagram showing the structure of a pressure sensor according to a first embodiment of the invention.

Embodiments of the invention as shown in the drawings will now be described in detail.

FIG. 1 is a cross-sectional diagram showing the structure of a pressure sensor according to the first embodiment of the invention.

A pressure sensor 1 includes: an airtight case 2 having a vacuum or inert atmosphere on the inside; first and second pressure input orifices 3a and 4a penetrating, respectively, opposing first and second opposing wall surfaces 3 and 4, a cylindrical first bellows 10 fixed on the first wall surface 3 at one end opening and equipped with a shaft hole communicating with the first pressure input orifice 3a, a cylindrical second bellows 11 fixed on the second wall surface 4 at one end opening, equipped with a shaft hole communicating with the second pressure input orifice 4a, and arranged in series with the first bellows 10, a resonator-adhering pedestal 15 arranged and fixed between other ends 10a and 11a of the respective first and second bellows 10 and 11, a lamellar piezoelectric resonator 20 supported by the resonator-adhering pedestal 15, a piezoelectric reinforcement plate 21 fixed at a position across the second bellows 11 from the piezoelectric resonator 20, and an oscillation circuit 30 electrically connected to an electrode pattern on the piezoelectric resonator. The piezoelectric resonator 20 is fixed on the second wall surface 4 at one end and fixed on the resonator-adhering pedestal 15 at the other end. The piezoelectric reinforcement plate 21 is fixed at both ends by the second wall surface 4 and the resonator-adhering pedestal 15.

The piezoelectric resonator 20 includes electrodes formed on a crystal substrate, for example.

The resonator-adhering pedestal 15 is equipped with: a base 15a sandwiched and fixed between the other ends 10a and 11a of both bellows 10 and 11, and a supporting piece 15b protruding from the periphery of the base 15a toward the second wall surface 4. The other ends of both the piezoelectric resonator 20 and the piezoelectric reinforcement plate 21 are fixed by the supporting piece 15b.

Each of the pressure input orifices 3a and 4a is communicating with the shaft hole inside each of the bellows 10 and 11, while the shaft holes themselves inside the bellows are held in a state of not communicating with each other by the base 15a of the resonator-adhering pedestal 15. Thus, the position of the resonator-adhering pedestal 15 moves back and forth in the axis direction of the bellows by the expansion and contraction of the bellows caused by the pressure difference between pressure P1 and pressure P2 that are input from both pressure input orifices 3a and 4a. The piezoelectric resonator 20 fixed on the resonator-adhering pedestal 15 at one end and fixed on the second wall surface 4 at the other end deforms when it receives the mechanical stress in the axis direction due to the pressure transmitted from the resonator-adhering pedestal 15, and the resonant frequency specific to the piezoelectric resonator fluctuates. That is, in a state that the oscillation circuit 21 arranged at a suitable place of the airtight case 2 in an airtight state is coupled to the excitation electrode on the piezoelectric substrate constituting the piezoelectric resonator 20, the piezoelectric substrate is excited by the electrical connection to an excitation electrode, and the pressure P1 or the pressure P2 is calculated based on the output frequency at this time.

According to the present embodiment, when the pressure P1 is input into the first pressure input orifice 3a, the force corresponding to this pressure is applied to the piezoelectric resonator 20 and to the piezoelectric reinforcement plate 21. Because of the presence of the piezoelectric reinforcement plate 21, only the force in the longitudinal direction (a Y-axis direction if a crystal resonator is used) is applied to the piezoelectric resonator 20, and the pressure-frequency relation characteristic of the piezoelectric resonator shows the quadratic curve. Consequently, the oscillation frequency of the piezoelectric resonator 20 varies linearly in response to the pressure P1, and, thereby, the high-precision pressure sensor can be obtained. In particular, because it is possible to use inexpensive molded bellows, there is no need to use the expensive electro-deposited bellows. Further, because there is no need to employ the flexure hinge structure in order to apply the force to the piezoelectric resonator only in the longitudinal direction, it is possible to simplify the support structure of the piezoelectric resonator.

As previously stated, if such cylindrical bellows are arranged in series, there is a problem of durability when impact is applied in the direction perpendicular to the axis direction (the X-axis direction) of the bellows.

In order to absorb the impact and prevent the piezoelectric resonator 20 from damage, the embodiment of the invention employs a structure in which a plurality of plate-like reinforcement springs (resilient reinforcement members) 50 composed of metal or other resilient material are arranged at suitable places of the resonator-adhering pedestal 15 at a predetermined circumferential pitch, bridging, in this example, the periphery of the base 15a and the inner wall of the airtight case 2. The plate-like reinforcement springs 50 may be arranged in any number; for example, two springs may be arranged at intervals of 180 degrees, or four springs may be arranged at intervals of 90 degrees.

In other words, because the outer end of each plate-like reinforcement spring 50 is fixed on the inner wall of the airtight case while the inner end thereof is fixed on the resonator-adhering pedestal 15, the reinforcement springs 50 control the vibration of the resonator-adhering pedestal 15 in the X-axis direction and absorb and alleviate the impact applied from the outside in the same direction. Further, the reinforcement springs 50 secure sufficient strength against the impact and vibration in the X-axis direction and, thereby, greatly improve the resistance of the pressure sensor to the impact and vibration while having less strength in the Y-axis direction. The plate-like reinforcement springs 50 can thus stay highly sensitive to the pressure in the Y-axis direction, just as sensitive as when the plate-like reinforcement springs are not present. In other words, because the plate-like reinforcement springs 50 absorb and alleviate the impact applied to the resonator-adhering pedestal 15 in the X-axis direction, only the force in the Y-axis direction is applied to the piezoelectric resonator 20, and the pressure-frequency relation characteristic of the piezoelectric resonator shows the quadratic curve.

Additionally, by arranging the plurality of (e.g., two or four) plate-like reinforcement springs 50 on the periphery of the resonator-adhering pedestal at the predetermined pitch (intervals of 180 or 90 degrees), it becomes possible to reliably respond to various forms of impact in the X-axis direction.

In particular, for the arrangement positions of the plate-like reinforcement springs 50, the circumferential position of the resonator-adhering pedestal corresponding to the arrangement position of the piezoelectric resonator 20 and the circumferential position of the resonator-adhering pedestal opposite from the piezoelectric resonator 20 are selected, so that it becomes possible to further increase the durability of the piezoelectric resonator 20 against the impact and vibration in the X-axis direction.

In the first embodiment described above, two cylindrical bellows are arranged in series in the case. However, because the size of the case increases as much as the combined axial length of the two cylindrical bellows, it is a drawback with respect to miniaturization of the pressure sensor.

Figures 2A, 2B:
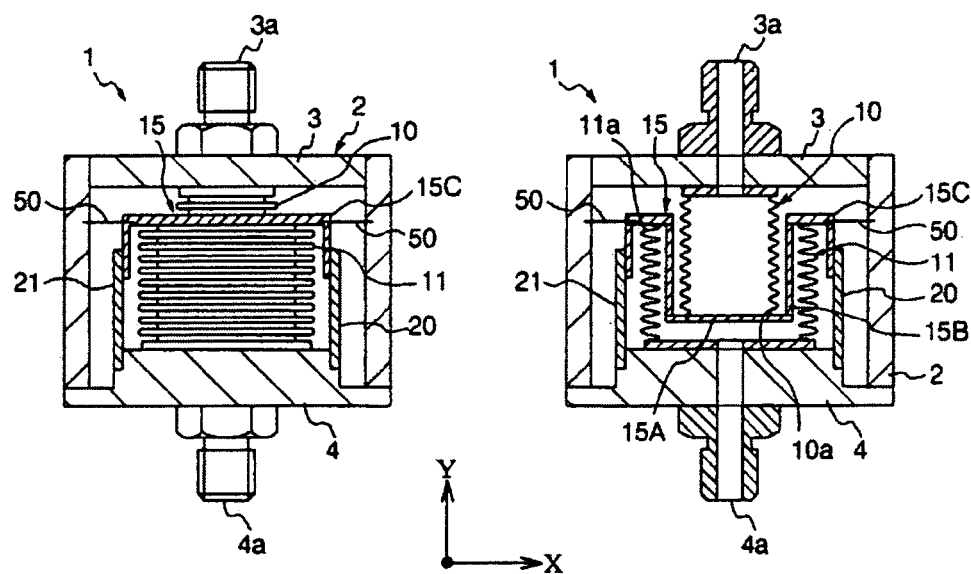
FIGS. 2A and 2B are cross-sectional diagrams to explain the internal structure of the pressure sensor according to a second embodiment of the invention.

FIGS. 2A and 2B are cross-sectional diagrams to explain the internal structure of the pressure sensor according to the second embodiment of the invention.

The pressure sensor 1 includes: the airtight case 2 having a vacuum or inert atmosphere on the inside; the first and second pressure input orifices. 3a and 4a penetrating, respectively, the opposing first and second opposing wall surfaces 3 and 4, the cylindrical first bellows 10 fixed on the first wall surface 3 at one end and equipped with the shaft hole communicating with the first pressure input orifice 3a, the cylindrical second bellows 11 fixed on the second wall surface 4 at one end and equipped with the shaft hole communicating with the second pressure input orifice 4a, the resonator-adhering pedestal 15 arranged and fixed between the other ends 10a and 11a of the respective first and second bellows 10 and 11, the lamellar piezoelectric resonator 20 supported by the resonator-adhering pedestal 15, the piezoelectric reinforcement plate 21 fixed at a position across the second bellows 11 from the piezoelectric resonator 20, and the oscillation circuit 30 electrically connected to an electrode pattern on the piezoelectric resonator. The piezoelectric resonator 20 is fixed on the second wall surface 4 at one end and fixed on the resonator-adhering pedestal 15 at the other end. The piezoelectric reinforcement plate 21 is fixed at both ends by the second wall surface 4 and the resonator-adhering pedestal 15.

The first bellows 10 is smaller in diameter than the second bellows 11. The other end 10a of the first bellows 10 is coaxially inserted in the shaft hole from the other end 11a of the second bellows having the larger diameter.

The resonator-adhering pedestal 15 is composed of: a center plate 15 fixed to the other end 10a of the first bellows 10, a cylindrical part 15B extending cylindrically from the periphery edge of the center plate 15 toward the first wall surface 3, and a turned edge 15C which is the tip of the cylindrical part 15B turned outward. The other end 11a of the second bellows 11 is abut and fixed on the inner surface of the turned edge 15C.

That is, the resonator-adhering pedestal 15 has a structure combining the center plate 15A supporting the other end 10a of the first bellows 10 and the turned edge 15C supporting the other end 11a of the second bellows 11 so as to coaxially support the two bellows 10 and 11 having unequal diameters. It is the feature of this structure that the center plate 15A located on the inner diameter side and the turned edge 15C located on the outer diameter side differ in their positions in the axis direction. By this structure, it becomes possible to partially overlap the two bellows in the axial length, shorten the total axial length of both bellows, and to successfully miniaturize the case.

The supporting piece at the tip of the turned edge 15C fixes each of the one ends of the piezoelectric resonator 20 and the piezoelectric reinforcement plate 21. The other ends of the piezoelectric resonator 20 and the piezoelectric reinforcement plate 21 are each fixed to the second wall surface 4.

Figure 3:
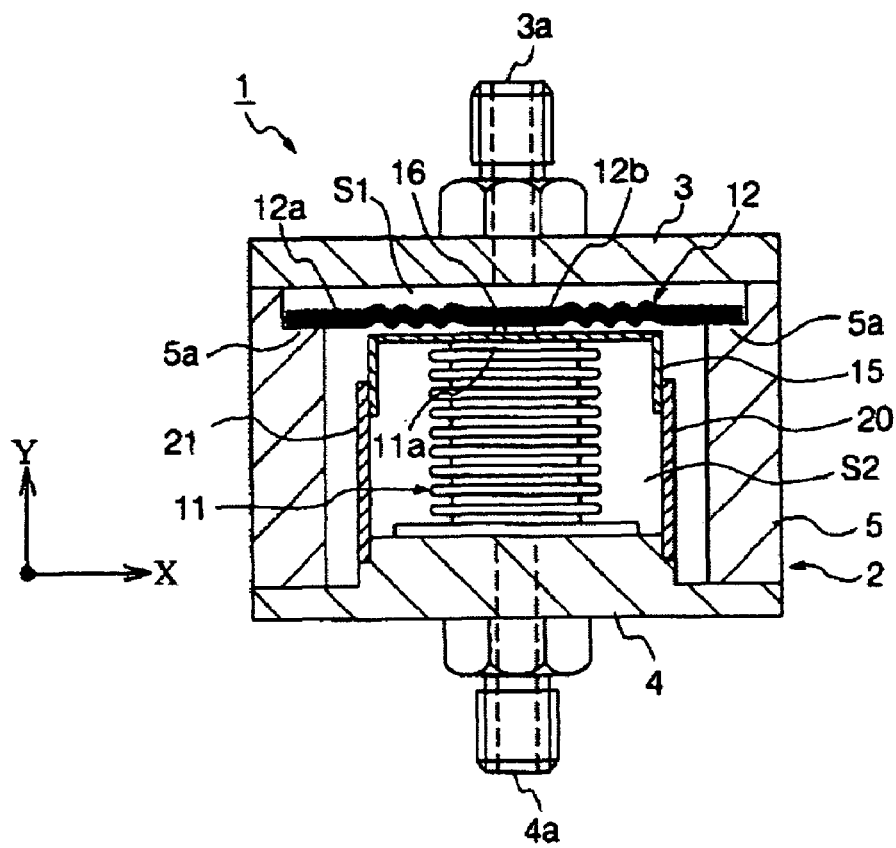
FIG. 3 is a cross-sectional diagram showing the structure of the pressure sensor according to a third embodiment of the invention.

Although not shown in FIG. 3, the oscillation circuit 30 as shown in the first embodiment is similarly incorporated in a suitable place of the case 2 in the airtight state.

In this embodiment, when the pressure P1 is input into the pressure input orifice 3a, for example, the force in response to the this pressure is applied to the piezoelectric resonator 20 and the piezoelectric reinforcement plate 21 via the resonator-adhering pedestal 15. In this case, due to the presence of the piezoelectric reinforcement plate 21, only the force in the longitudinal direction (the Y-axis direction if the crystal resonator is used) is applied to the piezoelectric resonator 20, and the pressure-frequency relation characteristic of the piezoelectric resonator shows the quadratic curve. Therefore, the oscillation frequency of the piezoelectric resonator 20 varies linearly in response to the pressure P1, and, thus, the high-precision pressure sensor can be obtained. In particular, because it is possible to use the inexpensive molded bellows, there is no need to use the expensive electro-deposited bellows. Further, because there is no need to employ the flexure hinge structure in order to apply the force on the piezoelectric resonator only in the longitudinal direction, it is possible to simplify the support structure of the piezoelectric resonator.

Further, because one of the bellows is fitted into the shaft hole of the other bellows instead of arranging the two cylindrical bellows in series, the pressure sensor can be miniaturized.

However, with the pressure sensor of FIGS. 2A and 2B, also, the durability against impact in the X-axis direction is less than the durability against impact in the Y-axis direction. Therefore, as shown in the drawings, it is preferable that the plate-like reinforcement springs (the reinforcement members) 50 be arranged between the resonator-adhering pedestal 15 and the inner wall of the airtight case 2 so that the strength against impact in the X-axis direction is enhanced.

With the pressure sensor of the embodiment of FIGS. 2A and 2B, because the two bellows 10 and 11 having unequal diameters are coaxially arranged into a nested structure, it is possible to shorten the axial length. However, since one of the bellows is arranged outside the other bellows, the outside bellows inevitably has the larger diameter, the structure of the resonator-adhering pedestal 15 and the assembly of the parts may become more complicated.

The pressure sensor of the third embodiment shown in FIG. 3 is to solve this problem. That is, it is the feature of this pressure sensor 1 that one of the first and second bellows, namely the first bellows, arranged in the airtight case 2 is a planar bellows.

In other words, this pressure sensor 1 includes: the airtight case 2 equipped with the first and second pressure input orifices 3a and 4a provided respectively on the opposing first and second wall surfaces 3 and 4 and with a side wall 5 joining the first wall surface 3 to the second wall surface 4; a planar first bellows (a pressure receiving part formed into a planar shape) 12 that forms a first airtight space S1 communicating with the first pressure input orifice 3a between the side wall 5 and the first wall surface 3 by fixing a peripheral edge 12a of the first bellows 12 on the side wall 5; the cylindrical second bellows 11 fixed on the second wall surface 4 at one end, equipped with the shaft hole communicating with the second pressure input orifice 4a, and arranged in serried with the first bellows 12; the resonator-adhering pedestal 15 arranged and fixed between a central part 12b of the first bellows 12 and the other end 11a of the second bellows 11; the lamellar piezoelectric resonator 20 supported by the resonator-adhering pedestal 15, and the oscillation circuit (not shown) electrically connected to an electrode pattern on the piezoelectric resonator 20. Further, the piezoelectric resonator 20 is fixed on the second wall surface 4 at one end and on the resonator-adhering pedestal 15 at the other end. Furthermore, the piezoelectric reinforcement plate 21 is fixed between the second wall surface 4 and the resonator-adhering pedestal 15 at a position across the second bellows 11 from the piezoelectric resonator 20.

The entire peripheral edge 12a of the first bellows 12 is fixed and supported by a step-like support part 5a provided on the inner periphery of the wide wall 5 so as to form the first airtight space S1 and to form, on the opposite side, a second airtight space S2 housing the elements such as the second bellows 11.

By composing the peripheral edge 12a of the first bellows 12 so as to have a stiffness greater than a predetermined stiffness for a predetermined width, it gains stability when supported by the side wall 5. Further, by also composing the central part 12b of the first bellows 12 so as have a stiffness greater than a predetermined stiffness for a predetermined width, it gains stability when joined to a protruding communication member 16 located at the center of the resonator-adhering pedestal 15. The parts of the bellows other than the peripheral edge 12a and the central part 12b are composed so that they can be flexed and deformed.

Figure 4:
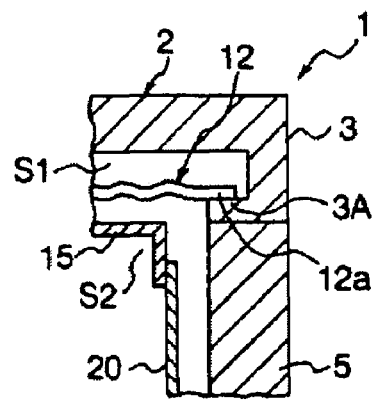
FIG. 4 is a diagram showing the structure of an essential part of a modified example of the third embodiment.

In the above-described embodiment, the peripheral edge 12a of the first bellows 12 is supported by the inner wall of the side wall 5. However, as shown in FIG. 4, a step-like support portion 3A, which is a downward pendent portion of the periphery of the first wall surface 3, may be provided so as to support the peripheral edge 12a of the first bellows by the portion of the first wall surface 3.

In the above-referenced structure, when the pressure P1 is input from the first pressure input orifice 3a, the force in response to the pressure is converted by the first and second bellows 12 and 11 and applied to the piezoelectric resonator 20 and the piezoelectric reinforcement plate 21. When the force corresponding to the pressure is applied, the resonant frequency of the piezoelectric resonator 20 varies in proportion to the applied pressure by the relation of the quadratic curve. Thus, by measuring the output frequency variation and performing correction operation by using the quadratic equation, the high-precision pressure measurement becomes possible.

Additionally, because the piezoelectric reinforcement plate 21 is located opposite from the piezoelectric resonator 20, only the force in the longitudinal direction (the Y-axis direction if the crystal resonator is used) is applied to the piezoelectric resonator 20, and the pressure-frequency relation characteristic of the piezoelectric resonator shows the quadratic curve. Therefore, the oscillation frequency of the piezoelectric resonator 20 varies linearly in response to the pressure P1, and the high-precision pressure sensor can thus be obtained. In particular, because it is possible to use the planar bellows as the first bellows 12, the total axial length of both bellows can be shortened. Also, because the second bellows 11 having the smallest possible diameter can be used, it is possible to limit the size of the pressure sensor in the diameter direction.

Further, by using the planar bellows, it becomes possible to obtain sufficient strength against the impact in the lateral direction (the X-axis direction), to greatly improve durability against the impact and vibration, and to enhance reliability.

Additionally, with the pressure sensor of FIG. 3, also, there is less durability against the impact in the X-axis direction than in the Y-axis direction. Therefore, as shown in the drawing, it is preferable to further enhance the strength against the impact in the X-axis direction by arranging the plate-like reinforcement springs (the plate-like reinforcement member) between the resonator-adhering pedestal 15 and the inner wall of the airtight case 2.

The pressure sensors described in the above embodiments can be applied to sensors such as a water pressure sensor (a water depth sensor), a barometer sensor, and a differential pressure sensor.

The entire disclosure of Japanese Patent Application No. 2005-243486, filed Autumn 24, 2005 is expressly incorporated by reference herein.

What is claimed is:

1. A pressure sensor comprising:
    an airtight case equipped with first and second pressure input orifices provided respectively on opposing first and second wall surfaces;
    a cylindrical first bellows fixed on the first wall surface at one end and equipped with a shaft hole communicating with the first pressure input orifice;
    a cylindrical second bellows fixed on the second wall surface at one end, equipped with a shaft hole communicating with the second pressure input orifice, and arranged in series with the first bellows;
    a resonator-adhering pedestal arranged and fixed between other ends of the first and second bellows;
    a lamellar piezoelectric resonator supported by the resonator-adhering pedestal; and
    an oscillation circuit electrically connected to an electrode pattern of the piezoelectric resonator, wherein:
    the piezoelectric resonator is fixed on the second wall surface at one end and fixed on the resonator-adhering pedestal at the other end;
    a piezoelectric reinforcement plate is fixed between the second wall surface and the resonator-adhering pedestal at a position across the second bellows from the piezoelectric resonator; and
    an inner wall of the airtight case is joined to the resonator-adhering pedestal by a resilient reinforcement member.

2. The pressure sensor according claim 1, wherein the resilient reinforcement member is a plate-like reinforcement spring, and a plurality of plate-like reinforcement springs are arranged on a periphery of the resonator-adhering pedestal at a predetermined circumferential pitch.

3. The pressure sensor according to claim 1, wherein the resilient reinforcement members are arranged in a circumferential direction of the resonator-adhering pedestal corresponding to the arrangement position of the piezoelectric resonator and in a circumferential direction of the resonator-adhering pedestal opposite from the piezoelectric resonator.

4. A pressure sensor comprising:
    an airtight case equipped with first and second pressure input orifices provided respectively on first and second opposing wall surfaces;
    a cylindrical first bellows fixed on the first wall surface at one end and equipped with a shaft hole communicating with the first pressure input orifice;
    a cylindrical second bellows fixed on the second wall surface at one end and equipped with a shaft hole communicating with the second pressure input orifice;
    a resonator-adhering pedestal arranged and fixed between other ends of the first and second bellows;
    a lamellar piezoelectric resonator supported by the resonator-adhering pedestal; and
    an oscillation circuit electrically connected to an electrode pattern of the piezoelectric resonator; wherein:
    the first bellows is smaller in diameter than the second bellows, and the other end of the first bellows and the other end of the second bellows are fixed by the resonator-adhering pedestal in a manner that the other end of the first bellows is inserted in the shaft hole from the other end of the second bellows;
    the piezoelectric resonator is fixed on the second wall surface at one end and fixed on the resonator-adhering pedestal at the other end;
    a piezoelectric reinforcement plate is fixed between the second wall surface and the resonator-adhering pedestal at a position across the second bellows from the piezoelectric resonator; and
    an inner wall of the airtight case is joined to the resonator-adhering pedestal by a resilient reinforcement member.

5. The pressure sensor according claim 4, wherein the resilient reinforcement member is a plate-like reinforcement spring, and a plurality of plate-like reinforcement springs are arranged on a periphery of the resonator-adhering pedestal at a predetermined circumferential pitch.

6. The pressure sensor according to according to claim 4, wherein the resilient reinforcement members are arranged in a circumferential direction of the resonator-adhering pedestal corresponding to the arrangement position of the piezoelectric resonator and in a circumferential direction of the resonator-adhering pedestal opposite from the piezoelectric resonator.

7. A pressure sensor comprising:
    an airtight case equipped with first and second pressure input orifices provided respectively on opposing first and second wall surfaces and with a side wall joining the first wall surface to the second wall surface;

a planar first bellows that forms a first airtight space communicating with the first pressure input orifice between a peripheral edge of the first bellows and the first wall surface or between the first wall surface and the side wall and that forms a second airtight space between the side wall and the second wall surface, by fixing the peripheral edge of the first bellows on a support part disposed on either the first wall surface or the side wall;

a cylindrical second bellows arranged in the second airtight space, fixed on the second wall surface at one end, equipped with a shaft hole communicating with the second pressure input orifice, and arranged in series with the first bellows;

a resonator-adhering pedestal arranged and fixed between a central part of the first bellows and an other end of the second bellows;

a lamellar piezoelectric resonator supported by the resonator-adhering pedestal; and an oscillation circuit electrically connected to an electrode pattern on the piezoelectric resonator, wherein:

the piezoelectric resonator is fixed on the second wall surface at one end and fixed on the resonator-adhering pedestal at the other end;

a piezoelectric reinforcement plate is fixed between the second wall surface and the resonator-adhering pedestal at a position across the second bellows from the piezoelectric resonator; and an inner wall of the airtight case is joined to the resonator-adhering pedestal by a resilient reinforcement member.

8. The pressure sensor according claim 7, wherein the resilient reinforcement member is a plate-like reinforcement spring, and a plurality of plate-like reinforcement springs are arranged on a periphery of the resonator-adhering pedestal at a predetermined circumferential pitch.

9. The pressure sensor according to according to claim 7, wherein the resilient reinforcement members are arranged in a circumferential direction of the resonator-adhering pedestal corresponding to the arrangement position of the piezoelectric resonator and in a circumferential direction of the resonator-adhering pedestal opposite from the piezoelectric resonator.

* * * * *